US009103544B2

(12) United States Patent
Igl et al.

(10) Patent No.: US 9,103,544 B2
(45) **Date of Patent: *Aug. 11, 2015**

(54) MICROCHANNEL COOLER FOR LIGHT EMITTING DIODE LIGHT FIXTURES

(71) Applicant: Phoseon Technology, Inc., Hillsboro, OR (US)

(72) Inventors: Scott Igl, Portland, OR (US); Thomas Molamphy, Portland, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,243

(22) Filed: Sep. 18, 2014

(65) Prior Publication Data

US 2015/0003067 A1 Jan. 1, 2015

Related U.S. Application Data

(63) Continuation of application No. 14/078,154, filed on Nov. 12, 2013, now Pat. No. 8,870,418, which is a continuation of application No. 13/153,322, filed on Jun. 3, 2011, now Pat. No. 8,591,078.

(60) Provisional application No. 61/351,215, filed on Jun. 3, 2010.

(51) Int. Cl.
*B60Q 1/06* (2006.01)
*F21V 29/00* (2015.01)
(Continued)

(52) U.S. Cl.
CPC . *F21V 29/30* (2013.01); *F21K 9/30* (2013.01); *F21V 29/02* (2013.01); *F21V 29/58* (2015.01);
(Continued)

(58) Field of Classification Search
USPC ......... 362/126, 294, 373, 218, 547, 555, 559, 362/580, 545, 800
See application file for complete search history.

(56) References Cited

U.S. PATENT DOCUMENTS 5,857,767 A 1/1999 Hochstein
5,936,353 A 8/1999 Triner et al.

(Continued)

FOREIGN PATENT DOCUMENTS

DE 19619154 A1 6/1997
DE 10127171 A1 12/2001

(Continued)

OTHER PUBLICATIONS

Data Sheet for G*SiC Technology Super Blue LEDs No. C430-CB290-E1200, manufactured by Opto Semiconductors, May 1, 1999, 8 pages.

(Continued)

*Primary Examiner* — Thomas A Hollweg
*Assistant Examiner* — Kevin Quarterman
(74) *Attorney, Agent, or Firm* — Alleman Hall McCoy Russell & Tuttle LLP

(57) ABSTRACT

A lighting module has an array of light emitters, a heat sink having a first surface, the array of light emitters being mounted to the first surface, a microchannel cooler arranged on a second surface of the heat sink on an opposite side of the heat sink from the first surface, the microchannel cooler arranged to transport a liquid through a channel on the second surface of the heat sink, and a cooling unit thermally coupled to a microchannel cooler and arranged to remove heat from the liquid.

19 Claims, 4 Drawing Sheets

(51) Int. Cl.

| | |
|---|---|
| ***F21V 29/02*** | (2006.01) |
| ***F21K 99/00*** | (2010.01) |
| ***F21V 29/58*** | (2015.01) |
| ***F21V 29/83*** | (2015.01) |
| *F21Y 105/00* | (2006.01) |
| *F21Y 101/02* | (2006.01) |
| *F21V 29/67* | (2015.01) |

(52) U.S. Cl.

CPC ............ *F21V 29/83* (2015.01); *F21V 29/2212* (2013.01); *F21V 29/677* (2015.01); *F21Y 2101/02* (2013.01); *F21Y 2105/001* (2013.01); *Y10S 362/80* (2013.01)

(56) References Cited

U.S. PATENT DOCUMENTS

| | | | | |
|---|---|---|---|---|
| 6,200,134 | B1 | 3/2001 | Kovac et al. | |
| 6,457,823 | B1 | 10/2002 | Cleary et al. | |
| 6,501,084 | B1 | 12/2002 | Sakai et al. | |
| 6,683,421 | B1 | 1/2004 | Kennedy et al. | |
| 6,692,250 | B1 | 2/2004 | Decaudin et al. | |
| 8,870,418 | B2 * | 10/2014 | Igl et al. | 362/373 |
| 2001/0046652 | A1 | 11/2001 | Ostler et al. | |
| 2002/0187454 | A1 | 12/2002 | Melikechi et al. | |
| 2003/0043582 | A1 | 3/2003 | Chan et al. | |
| 2003/0081096 | A1 | 5/2003 | Young | |
| 2004/0120162 | A1 | 6/2004 | Tsimerman et al. | |
| 2008/0068852 | A1 | 3/2008 | Goihl | |
| 2008/0170400 | A1 | 7/2008 | Maruyama | |
| 2008/0285298 | A1 | 11/2008 | Shuy | |
| 2010/0177519 | A1 | 7/2010 | Schlitz | |
| 2010/0265709 | A1 | 10/2010 | Liu | |

FOREIGN PATENT DOCUMENTS

| | | | |
|---|---|---|---|
| EP | 0879582 | A2 | 11/1998 |
| EP | 1158761 | A1 | 11/2001 |
| EP | 1599340 | B1 | 9/2007 |
| WO | 9507731 | A1 | 3/1995 |
| WO | 0059671 | A1 | 10/2000 |
| WO | 0067048 | A2 | 11/2000 |
| WO | 0211640 | A2 | 2/2002 |
| WO | 0213231 | A2 | 2/2002 |
| WO | 03023875 | A2 | 3/2003 |

OTHER PUBLICATIONS

Data Sheet for 5.0 mm Blue Series LEDs No. LNG992CFB, manufactured by the Panasonic Corporation, Mar. 2001, 1 page.

Data Sheet for 3.0 mm Blue Series LEDs No. LNG997CKB, manufactured by the Panasonic Corporation, Mar. 2001, 1 page.

* cited by examiner

MICROCHANNEL COOLER FOR LIGHT EMITTING DIODE LIGHT FIXTURES

CROSS REFERENCE TO RELATED APPLICATIONS

The present application is a continuation of U.S. patent application Ser. No. 14/078,154, filed Nov. 12, 2013 and entitled MICROCHANNEL COOLER FOR LIGHT EMITTING DIODE LIGHT FIXTURES, which is a continuation of U.S. patent application Ser. No. 13/153,322, filed Jun. 3, 2011 and entitled MICROCHANNEL COOLER FOR LIGHT EMITTING DIODE LIGHT FIXTURES, now U.S. Pat. No. 8,591,078, which claims priority to U.S. Provisional Patent Application No. 61/351,215, filed Jun. 3, 2010 and entitled MICROCHANNEL COOLER FOR LIGHT EMITTING DIODE LIGHT FIXTURES, the entire contents of each of which are hereby incorporated by reference for all purposes.

BACKGROUND AND SUMMARY

Solid-state light emitting devices, such as light-emitting diodes (LEDs), have become more common in curing applications such as those using ultra-violet light. Solid-state light emitters have several advantages over traditional mercury arc lamps including that they use less power, are generally safer, and are cooler when they operate.

However, even though they generally operate at cooler temperatures than arc lamps, they do generate heat. Since the light emitters generally use semiconductor technologies, extra heat causes leakage current and other issues that result in degraded output. Management of heat in these devices allows for better performance. As the demand rises for higher irradiance output from these devices heat management becomes more important.

One traditional cooling technique uses a heat sink, which generally consists of thermally conductive materials mounted to the substrates upon which the light emitters reside. Some sort of cooling or thermal transfer system generally interacts with the back side of the heat sink, such as heat dissipating fins, fans, liquid cooling, etc., to draw the heat away from the light emitter substrates. The efficiency of these devices remains lower than desired, and liquid cooling systems can complicate packaging and size restraints. However, transferring the heat from the LED to the liquid allows the liquid to transport the heat away from the LED resulting in efficient cooling.

DETAILED DESCRIPTION

Figure 1:
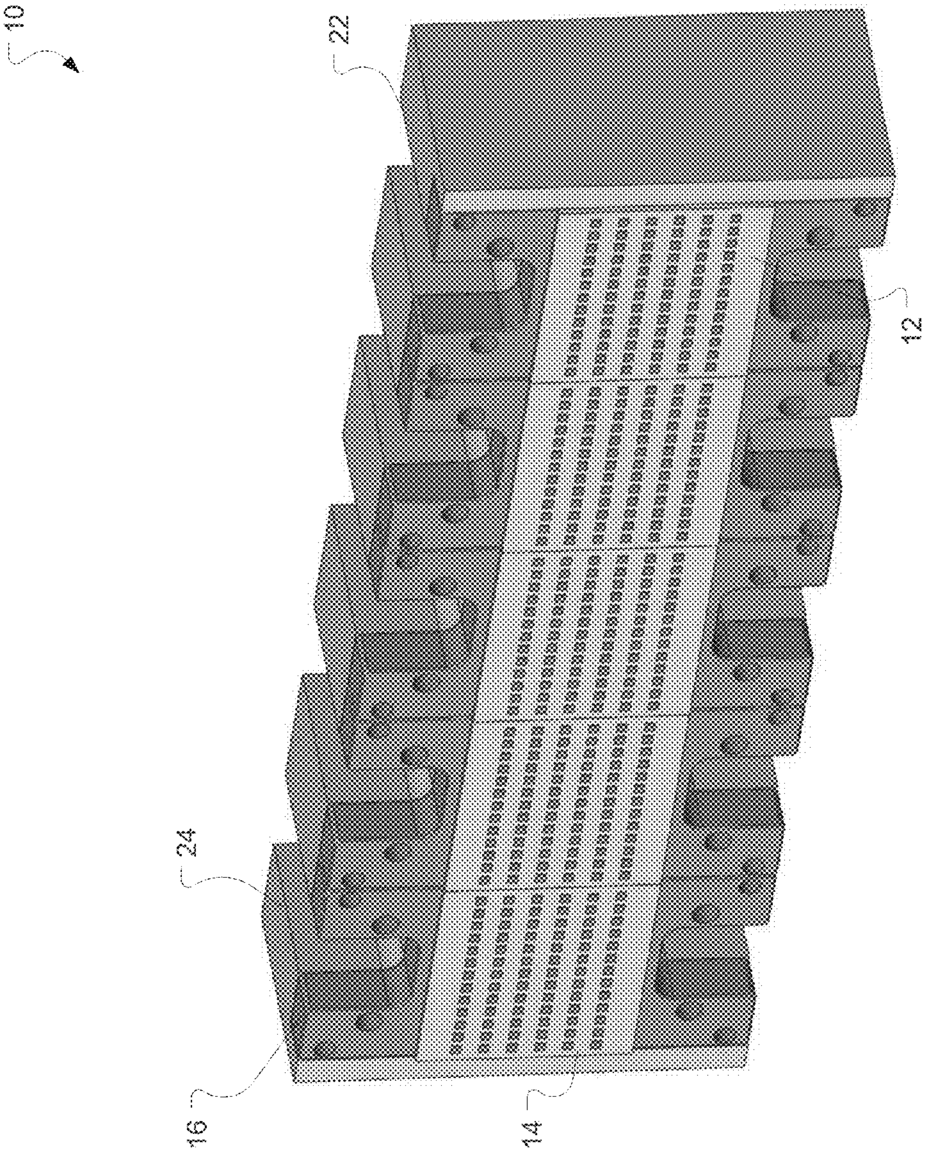
FIG. 1 shows an embodiment of a large area array of light emitters with a microchannel cooler.

FIG. 1 shows an embodiment of a lighting module 10 mounted to a heat sink in which resides a microchannel cooler. The term ‘microchannel’ refers to a channel that has a width in a micrometer scale. In one embodiment, the channels are in the range of 100 micrometers to 50 micrometers wide.

In this particular embodiment, the lighting module 10 consists of 5 individual LED arrays such as 12 and 14. These 5 LED arrays may each be a Silicon Light Matrix™ (SLM™) manufactured by Phoseon Technology, Inc., but are not limited to that specific type of LED array. The LED arrays may consist of many different configurations from a line of single LEDs, to multiple LEDs on a substrate, possibly multiple substrates arranged together.

In this embodiment, each LED array has it own microchannel cooler with the fluid flow in parallel with the other microchannel coolers. For example, the microchannel cooler manifold 22 behind the LED array 12 will have an input port and an output port for fluid to flow through microchannels on the back side of the heat sink 16. This liquid may travel from the region adjacent the LED to a chiller that cools the liquid and returns independent of the other microchannel coolers such as 24, which resides adjacent the LED array 14.

One advantage of this approach lies in its modularity. The LED array, such as the SLM™ discussed above, residing on its own heat sink with its own integrated microchannel cooler becomes a module. If some component of that module fails, such as the LED array or the microchannel cooler, the module can be replaced without affecting the other modules in the overall light module.

The heat sink 16 has channels in the back side, as oriented in the drawing. The heat sink 16 typically consists of a material having a high thermal conductivity, such as copper. The channels are formed such that there is a thinner layer of copper between the LED array and the liquid in the channel. This allows for more efficient heat transfer between the LED substrate and the liquid.

Generally, the microchannel units consist of a stack of very thin copper plates. Each plate is etched, laser machined or otherwise patterned with an array of features such that when the plates are stacked, the features align to form the microchannels. The stacking of the plates generally consists of heat-treating, diffusion bonding or otherwise bonding the plates together to form a single piece of copper. The plate in the stack that ends up next to the LED array is the thin layer of copper mentioned above.

Figure 2:
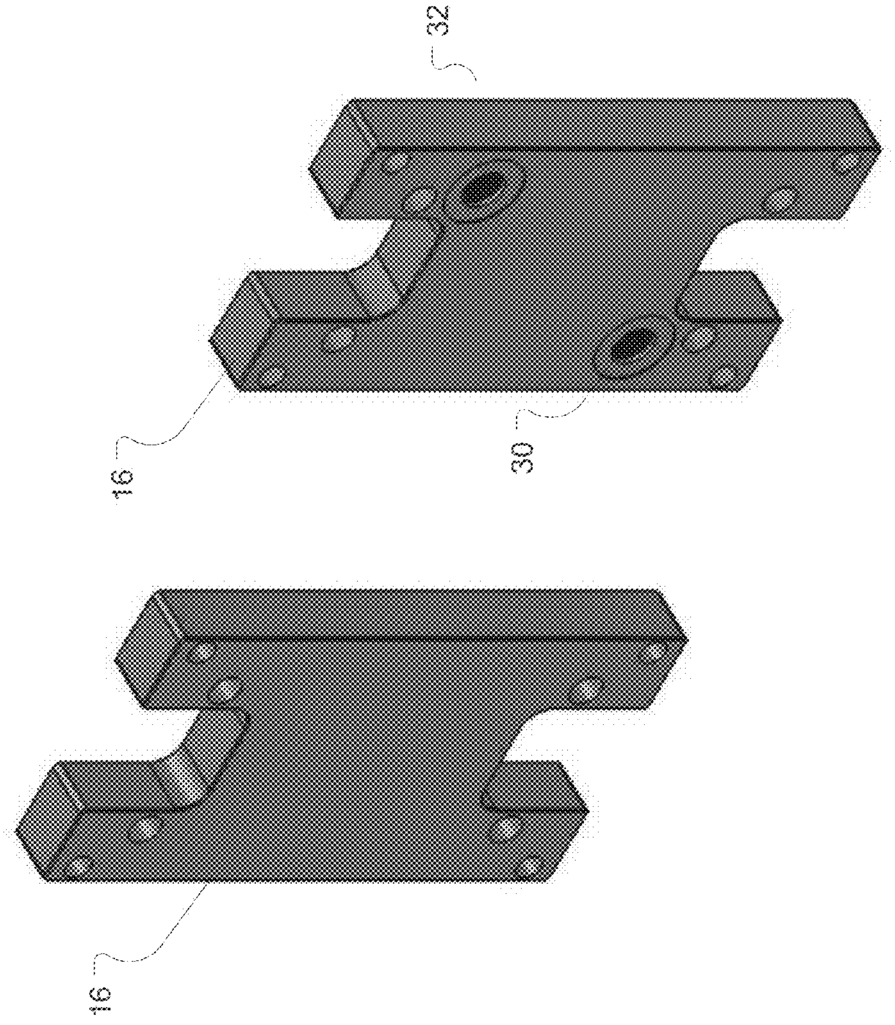
FIG. 2 shows a back view of a microchannel cooler.

FIG. 2 shows the liquid ports in the back side of the heat sink 16. One port 30 allows the liquid to be brought into the microchannel cooler/heat sink and the other port 32 takes the liquid out of the heat sink and allows it to be routed to the cooler. The selection of which port is for which is left up to the system designer, as is the positioning of the ports. They could be parallel horizontally, vertically, offset, etc.

In addition, the channels may have one or more curves or bends to route the liquid across a greater surface area of the heat sink, thereby increasing the amount of heat that transfers to the liquid in the microchannel. Another adaptation may include structures to increase the turbulence in the liquid as it flows in the channel. The increased turbulence ‘mixes’ the liquid to allow it to absorb more heat. These structures may include a roughened surface of the microchannel in the heat sink, or using multiple bends and curves in the channel structure.

Figure 3:
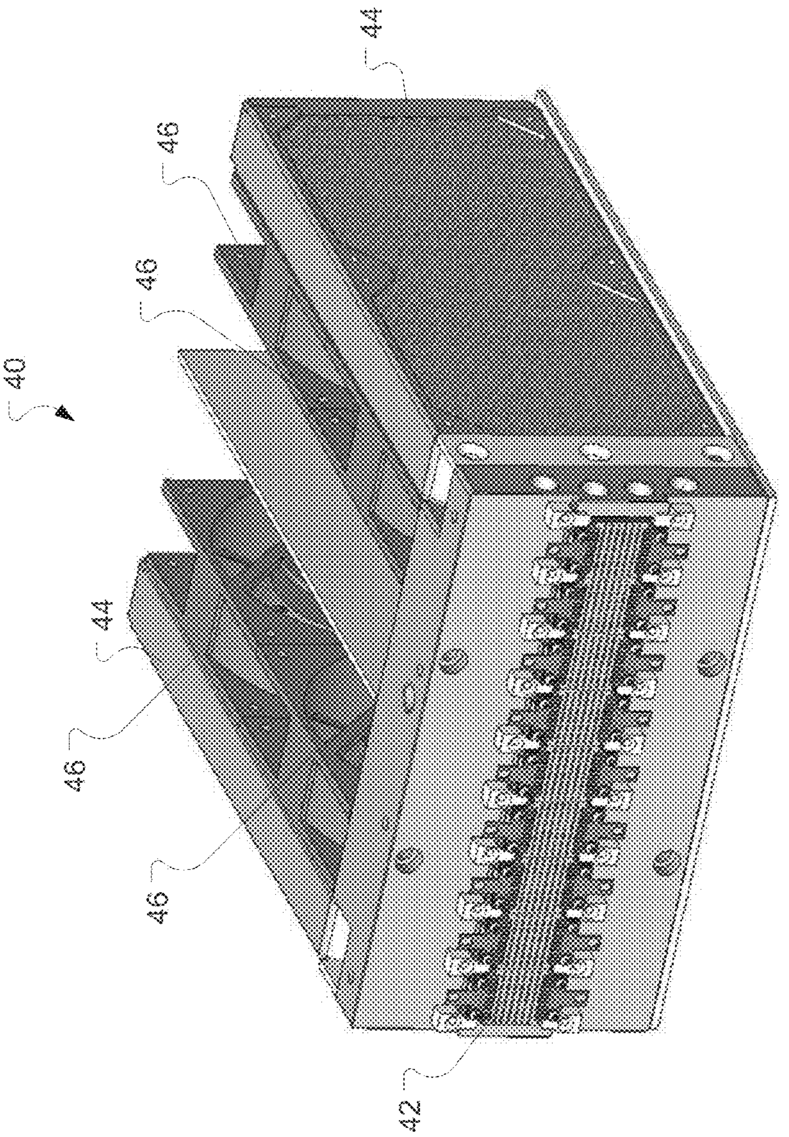
FIG. 3 shows an embodiment of an air-cooled microchannel cooler.

As mentioned above, the liquid in the microchannel is cooled when it is routed by a chiller of some sort. FIG. 3 shows an embodiment of an air microchannel cooler, 40. The LED arrays would mount to the front of the individual microchannel coolers 42, of which there are 9 in this example. Each of these would have ports on the back such as those shown in FIG. 2. The liquid from each microchannel cooler would be routed to the radiators 44.

In this embodiment, there are two radiators 44, each of which has two fans 46. However, one skilled in the art will recognize that the number of radiators and fans are design choices left up to the system designer and may depend upon the space available, the size requirements, the power consumption of the fans, etc.

The liquid from the microchannel coolers passes through the radiators 44 and the fans 46 take the heat away from the liquid. This allows the liquid to cool, and it then passes by the LED arrays to provide cooling. The liquid from each microchannel cooler travels in parallel with the liquid from the other microchannel coolers in the unit 40. This allows for more efficient cooling.

Figure 4:
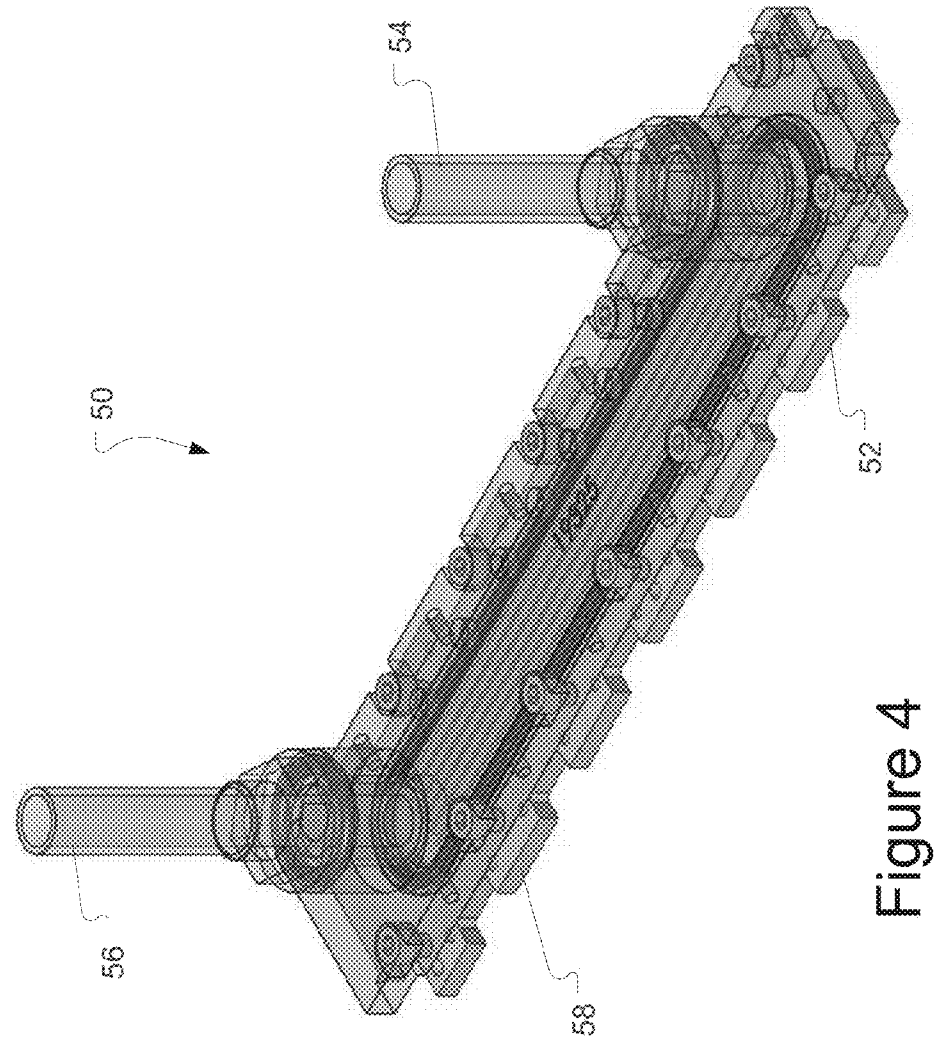
FIG. 4 shows an example of a series, liquid cooler.

In experiments, the microchannel cooler performance was compared to a current implementation of a liquid cooler. For contrast purposes, FIG. 4 shows an example of a cooler used in the experiments. The cooler 50 is a liquid cooler having an input port 54 and an output port 56. Each LED array mounts to the front of the heat sinks such as 52 and 58.

During operation, the liquid enters through the input port 54 and passes behind the heat sinks of the individual LED arrays in series. This means that the heat sink 58 has the liquid passing behind it holding the heat from the LED array at heat sink 52 and the LED arrays between heat sinks 52 and 58. The liquid must either be cooled much more than would be necessary in a parallel cooling arrangement as in FIG. 3, or the heat absorbed by the liquid at heat sink 58 will be far less than desired.

In the experiments, the same LED array was mounted to a current implementation of a heat sink and cooler, and a heat sink and a microchannel cooler. The flow rate of the liquid was varied from 0.5 to 1.5 liters per minute. The LED array was powered to generate 8 Watts/centimeter squared light output. The junction temperature for the LED was 64° C. for the current cooler and 35° C. for the microchannel cooler.

In addition, the maximum irradiance increased by 40%. Because LEDs are semiconductor devices, they are sensitive to temperature changes. Higher temperatures cause leakage current, reducing the overall efficiency of the device. Using the microchannel cooler, the efficiency of the LED array increased by 1%, and the maximum output irradiance increased by 40%.

In this manner, a lighting module can employ a heat sink having microchannel coolers to dissipate heat away from the array of light emitters. This allows the light emitters to operate more efficiently at cooler temperatures, using less power with more consistent performance and with a longer lifetime.

Although there has been described to this point a particular embodiment for a solid-state light emitter light module using a microchannel cooler, it is not intended that such specific references be considered as limitations upon the scope of these embodiments.

The invention claimed is:

1. A lighting system, comprising:
- an array of light emitters, arranged on a first surface of a substrate;
- one or more microchannel coolers mounted behind the array on an opposite side of the substrate, the one or more microchannel coolers including an input port to allow a liquid to enter the one or more microchannel coolers and flow through microchannels in the one or more microchannel coolers, and an output port to exhaust the liquid after flowing through the microchannels in the one or more microchannel coolers, the one or more microchannel coolers comprising a plurality of plates arranged in a stack;
- a microchannel cooler manifold attached to the opposite side of the one or more microchannel coolers;
- at least one fan; and
- one or more radiators receiving exhausted liquid from the microchannel cooler manifold.

2. The lighting system of claim 1, wherein the array of light emitters includes a plurality of arrays of light emitters positioned forward of the substrate.

3. The lighting system of claim 2, wherein the plurality of arrays is mounted directly to the first surface of the substrate.

4. The system of claim 1, wherein the array of light emitters comprises at least a plurality of rows and a plurality of columns of light-emitting diodes.

5. The system of claim 1, wherein the plates comprise copper.

6. The system of claim 1, wherein the plates are etched, laser machined or patterned with one or more features aligned to form the microchannels with the plates stacked.

7. The system of claim 1, wherein the liquid from a plurality of the one or more microchannel coolers travels in parallel with one another through the microchannel cooler manifold to the one or more radiators.

8. The system of claim 7, wherein the at least one fan is positioned perpendicular to the substrate.

9. The system of claim 1, wherein the input port and output port of each of the one or more microchannel coolers are mounted perpendicularly to a plane of a respective microchannel cooler surface that is facing away from the light emitters.

10. The system of claim 1, wherein the microchannel cooler manifold is positioned between the one or more microchannel coolers and the one or more radiators.

11. The system of claim 1, wherein the microchannel cooler manifold comprises input and output passages through which liquid enters and exits.

12. A lighting system, comprising:
- an array of light emitters, arranged on a first surface of a substrate;
- one or more microchannel coolers mounted behind the array on an opposite side of the substrate, the one or more microchannel coolers including an input port to allow a liquid to enter the one or more microchannel coolers and flow through microchannels in the one or more microchannel coolers, and an output port to exhaust the liquid after flowing through the microchannels in the one or more microchannel coolers, the one or more microchannel coolers comprising a plurality of plates arranged in a stack;
- a microchannel cooler manifold attached to the opposite side of the one or more microchannel coolers;
- at least one fan; and
- one or more radiators receiving exhausted liquid from the microchannel cooler manifold, wherein the plates are etched, laser machined or patterened with one or more features aligned to form the microchannels with the plates stacked, and wherein the input port and output port of each of the one or more microchannel coolers are mounted perpendicularly to a plane of a respective microchannel cooler surface that is facing away from the light emitters.

13. The lighting system of claim 12 wherein the array of light emitters includes a plurality of arrays of light emitters positioned forward of the substrate.

14. The lighting system of claim 13 wherein the plurality of arrays is mounted directly to the first surface of the substrate.

15. The system of claim 12, wherein the light emitters comprises at least a plurality of rows and a plurality of columns of light-emitting diodes, and wherein the plates comprise copper.

16. The system of claim 12, wherein the liquid from a plurality of the one or more microchannel coolers travels in parallel with one another through the microchannel cooler manifold to the one or more radiators.

17. The system of claim 16, wherein the at least one fan is positioned perpendicular to the substrate.

18. The system of claim 12, wherein the microchannel cooler manifold is positioned between the one or more microchannel coolers and the one or more radiators.

19. The system of claim 12, wherein the microchannel cooler manifold comprises input and output passages through which liquid enters and exits.

* * * * *